United States Patent [19]

Timme

[11] Patent Number: 4,571,995
[45] Date of Patent: Feb. 25, 1986

[54] DIGITAL READOUT INDICATOR OF OXYGEN USAGE, PRESSURE AND FLOW

[75] Inventor: William F. Timme, Oradell, N.J.

[73] Assignees: William S. Adam, Maywood; John J. Walsh, Waldwick, both of N.J.

[21] Appl. No.: 650,094

[22] Filed: Sep. 13, 1984

[51] Int. Cl.⁴ ............................................. G01F 13/00
[52] U.S. Cl. .................................... 73/199; 73/705; 73/714; 73/861.77; 250/231 P; 250/231 SE; 340/688
[58] Field of Search ...................... 73/705, 714, 861.77, 73/199; 250/231 P, 231 SE; 340/606, 626, 688

[56] References Cited

U.S. PATENT DOCUMENTS

| | | | |
|---|---|---|---|
| 737,296 | 8/1903 | Taylor | 73/397 |
| 2,295,869 | 9/1942 | Seaman | 340/775 |
| 2,452,344 | 10/1948 | Addorisio | 340/688 |
| 3,319,623 | 5/1967 | London | 128/683 |
| 3,320,604 | 5/1967 | Baer | 340/688 |
| 3,441,740 | 4/1969 | De Cloux et al. | 340/688 |
| 4,016,536 | 4/1977 | La Chapelle | 340/688 |
| 4,086,488 | 4/1978 | Hill | 250/231 SE |
| 4,086,580 | 4/1978 | Schroeder | 250/231 SE |
| 4,096,383 | 6/1978 | Mancini et al. | 250/231 SE |
| 4,107,661 | 8/1978 | Crosby | 340/688 |
| 4,197,650 | 4/1980 | Bailey et al. | 33/143 L |
| 4,275,393 | 6/1981 | Johnston | 340/688 |

Primary Examiner—Donald O. Woodiel
Attorney, Agent, or Firm—Ralph R. Roberts

[57] ABSTRACT

A digital readout and display adapted for use with a tank of oxygen under pressure provides pressure regulation, discerning of the pressure in the tank and consumption of the oxygen. A small battery within a case member powers this display. The readout device includes a gauge with a movable element responsive to pressure. An S-shaped rod is carried by and fixed to this shaft. This rod is very light in weight and in a secured condition is free at both ends to prevent friction of moving parts. The discharge end of this light-conducting rod comes in way of a light receiver carried by the body of the gauge. There is a multiplicity of receivers arrayed in a circular pattern near the edge of the gauge body and the light from this rod actuates a reed switch which sends an electrical signal to a microprocessor thence to an LED digital display. A single emitter may be used to send light through three rods each of which is carried by a gauge-type device.

24 Claims, 12 Drawing Figures

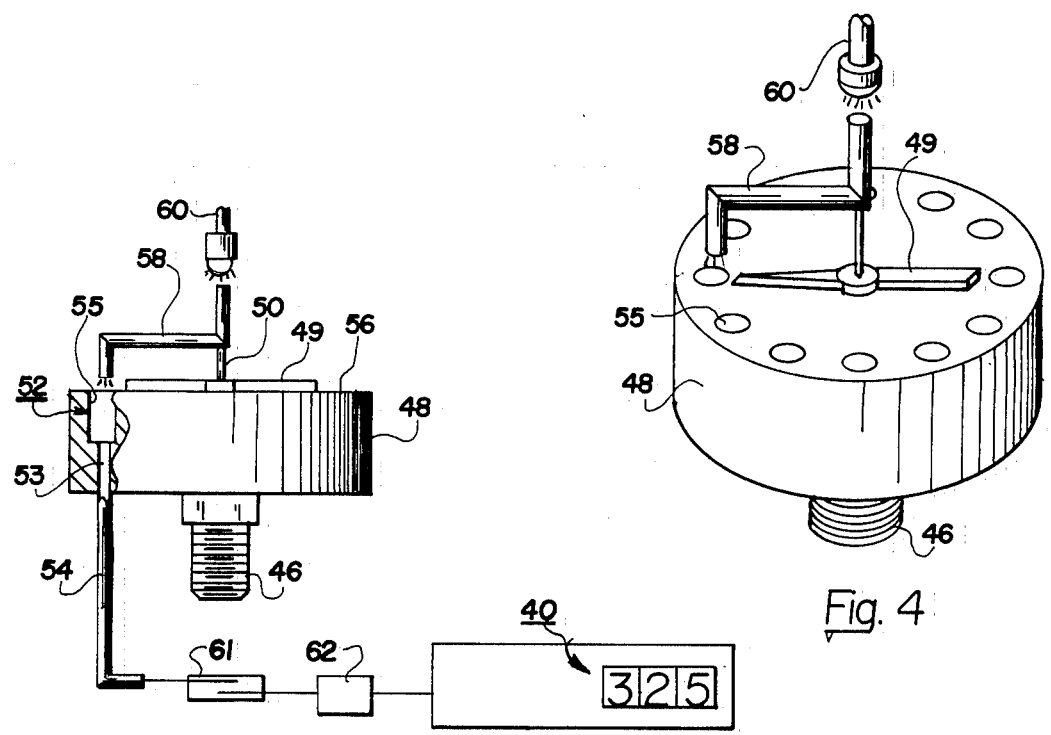
Fig. 4
Fig. 3
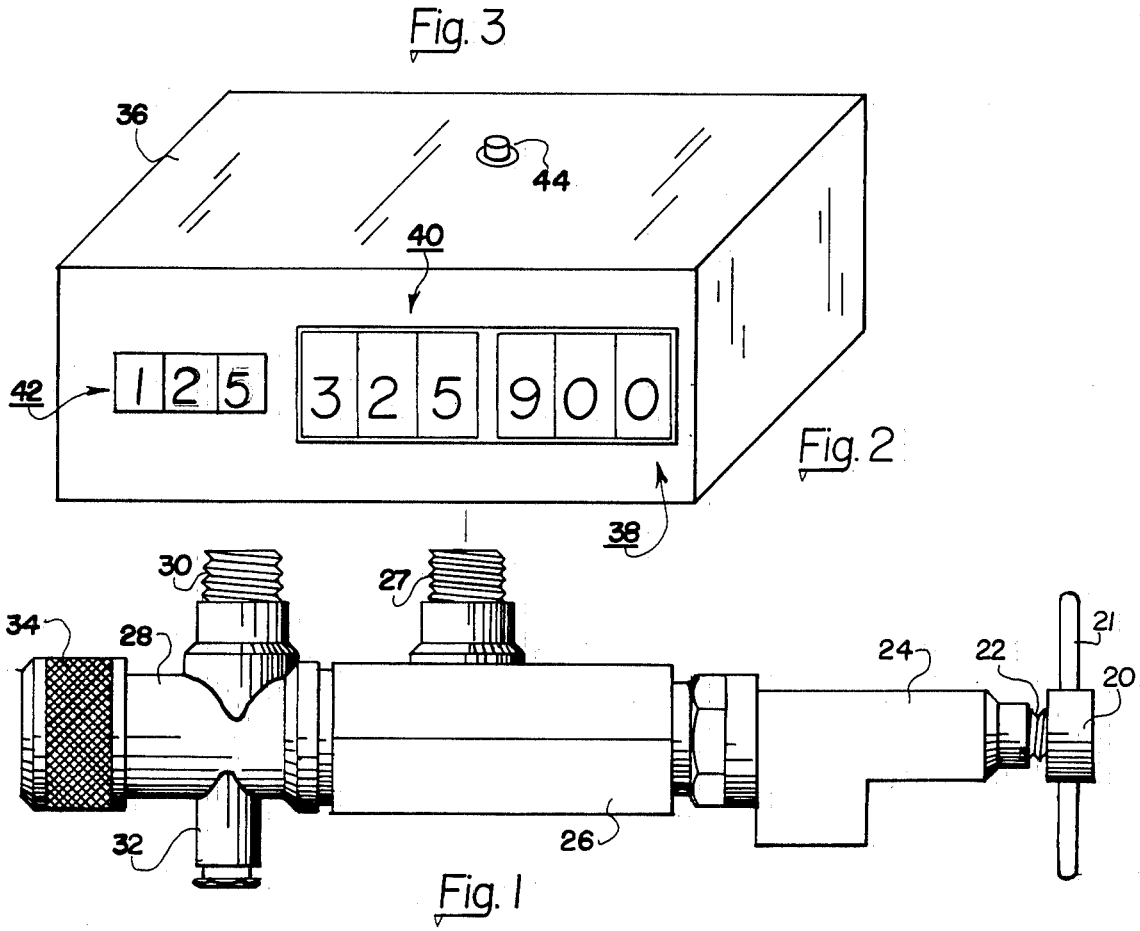
Fig. 2
Fig. 1

DIGITAL READOUT INDICATOR OF OXYGEN USAGE, PRESSURE AND FLOW

BACKGROUND OF THE INVENTION

1. Field of the Invention

With respect to the classification of art as established in and by the U.S. Patent and Trademark Office, this invention is believed to be found in the general class of pressure regulators, pressure indicators and flow totalizers used with tank-type containers of oxygen.

2. Description of the Prior Art

A careful pre-Ex search was made in the U.S. patents and particularly for visual indicators for use with oxygen tanks. Rotary indicators with a visual readout or indication are very old. These indicators are usually with incandescent lamps and with the electrical energy used therewith, potential sparking at the contacts may occur. The possible presence of oxygen is noted so that in the present invention there is no possible production of a spark. The use of pressure regulators is well known and the diaphragm control of pressure is conventionally provided with a threaded turning control of the diaphragm. These regulators conventionally have a dial with a rotatable needle that indicates the pressure. The dial is usually quite small and for a user of oxygen may be quite difficult to read. The present invention provides an LED display of the pressure regulation so that the user can easily avail himself or herself of a desired or required pressure release. With electronic signal generation, these same signals may be sent to other control devices to make the pressure level with control by automatic means.

Pressure is usually read by a moving rotary dial in a pressure gauge. The common and very reliable pressure-indicating gauge utilizes a curved tube (Bourdon) device which as it is actuated rotates a shaft and needle. This type of gauge is difficult to read because of the usually small dial size. Totalizers are not new, but so as to assure the user of the oxygen bottle or tank it is comforting to have knowledge of the amount of gas used and as a consequence what amount still remains. Linear display devices are also known. These devices usually use a light ball in a vertical tube.

In the pre-Ex search, the following patents were found:

| Patent No. | Inventor | Issuing |
|---|---|---|
| 737,296 | Taylor | 08-25-03 |
| 2,295,869 | Seaman | 09-15-42 |
| 2,452,344 | Addorisio | 10-26-48 |
| 3,319,623 | London | 05-16-67 |
| 4,016,536 | LaChappelle | 04-05-77 |
| 4,107,661 | Crosby | 08-15-78 |
| 4,197,650 | Bailey et al | 04-15-80 |
| 4,275,393 | Johnston | 06-23-81 |

Taylor discloses a device for testing lung pressure and capacity utilizing a series of lights for indicating specific pressures or volumes. Seaman shows a neon sign having a switch provided with wiping contacts to activate specific sections of the sign. Addorisio shows an automobile speedometer having a needle providing wiping contact for a plurality of lights. London discloses a blood pressure monitor having two species of indicating lights, one controlled by a linear manometer and the other by a pivoted needle. LaChappelle shows another speedometer needle providing wiping contact for an indicating light. Crosby shows yet another meter pointer position indicator. Bailey et al shows another column gauge. Johnston shows a needle position indicator for a pressure gauge.

In the above-identified art there is no showing of a digital readout using LED's for the display. Rotary needle display is well known, but the use of an extending shaft or rod is novel. On this rod or shaft is carried the S-curved light conductor which is free at both ends so as to avoid any and all possible frictional contact and possible inaccuracy. As to be hereinafter more fully described in conjunction with the drawings, the rotary devices all contemplate the feeding of a light signal through a bent optic rod carrying this light signal to a light-receiving means whereat an electrical signal is sent to an enclosed reed switch which is actuated so as to send this signal to a microprocessor. This signal is converted to a signal to an LED readout display. The emitting light source is usually an infrared LED using low electrical voltate and energy, with the battery (self-contained) lasting for many months of use. This light is conducted by a bent rod or fiber optic which is small in size and weight. The rotatable shaft of the pressure regulator and pressure gauge carries this bent rod or fiber and because of the light weight the action of the moved shaft is not affected by this additional member. A special shaft is provided for this regulator and gauge by which the light-conducting rod is mounted in a desired oriented condition.

SUMMARY OF THE INVENTION

This invention may be summarized, at least in part, with reference to its objects. It is an object of this invention to provide, and it does provide, oxygen monitoring with digital readouts in which pressure in the tank, pressure adjustment or regulation and consumption are each fed to a microprocessor.

A further object of this invention is to provide, and it does provide, an attachment to an oxygen or like gas supply tank whereat regulation of flow, consumption and pressure in the tank is read by gauge means which moves a fiber optic rod in direct relationship to a rotated shaft or housing and with reading a redirected light signal to a reed switch, thence to a microprocessor and to an indicated LED display for a numerical readout.

In brief, this invention provides apparatus primarily for oxygen use by a patient. Often the patient or user has difficulty in reading the pressure and flow as these are usually on a dial. These numbers are often difficult to differentiate and flow regulation may change after the patient seats himself or herself remote from the oxygen tank. This unit, which is sufficiently compact to be mounted on top of the gas supply tank, contains three metering systems which transmit information to a microprocessor through fiber optic systems. This monitoring system provides improved visibility with a multi-readout of three functions without alteration of accuracy and with an economical system.

This monitoring device replaces standard needle-type units as well as ball flotation devices. Standard needle-type meters are modified to provide axial shaft or rods which carry S-shaped optic fibers or light-conducting members. Light is provided at one end of this conducting member and, as said shaft rotates, the emerging light comes in way of a receiver which actuates a reed switch sending an electrical signal to the microprocessor which sends an appropriate signal to the digital readout.

This apparatus is contemplated to be used with a portable oxygen tank. Oxygen is the most common gas used for patients with breathing and heart problems. Often these patients are older and have visual impairment or difficulties and the monitoring of a gauge with a dial readout or indicator is difficult to establish and read. The present invention provides a digital readout so that visual confirmation is easy and available at all times of use. The device is shown with modifications that may be utilized to avoid the preferred embodiment.

In addition to the above summary, the following disclosure is detailed to insure adequacy and aid in understanding of the invention. This disclosure, however, is not intended to cover each new inventive concept no matter how it may later be disguised by variations in form or additions of further improvements. For this reason, there has been chosen a specific embodiment of a digital readout of the vital controls for an oxygen or like tank as adopted for use with portable tanks used for supplying oxygen and the like to users thereof and showing a preferred means for construction of the device. This specific embodiment has been chosen for the purposes of illustration and description as shown in the accompanying drawings wherein:

BRIEF DESCRIPTION OF THE DRAWINGS

FIG. 1 represents a side view, partly diagrammatic, and showing the connection and screw control means for regulating the pressure in an attachable oxygen bottle or tank;

FIG. 2 is a diagrammatic, isometric view of a cabinet in which are contained the several components of this invention and displaying on the front digital readout means for the pressure of the effluent stream, the pressure in the storage bottle or tank and a totalized readout giving a totalized indication of the oxygen consumed or used;

FIG. 3 is a side view, partly diagrammatic, and showing a simplified circuit indicating the flow path to cause the circuit to be actuated;

FIG. 4 represents an isometric view in a slightly enlarged scale, and still diagrammatic, of a rotary gauge or regulator;

In the following description and in the claims, various details are identified by specific names for convenience. These names are intended to be generic in their application. Corresponding reference characters refer to like members throughout the several figures of the drawings.

Figure 5:
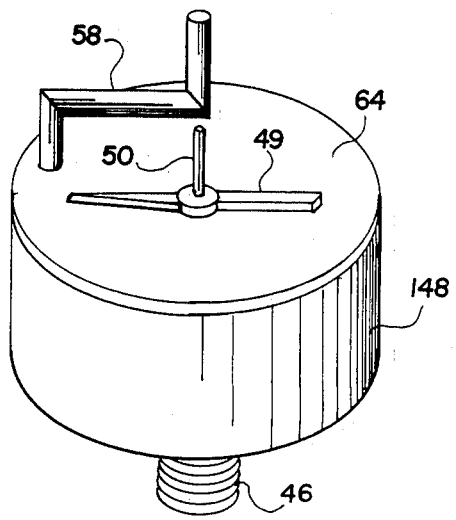
FIG. 5 represents an isometric view, partly fragmentary, of a rotary gauge or regulator with a vertical post or shaft ready for the attachment thereto of an optic fiber or rod bent into an "S" shape.

The drawings accompanying, and forming part of, this specification disclose details of construction for the purpose of explanation, but structural details may be modified without departure from the concept and principles of the invention and the invention may be incorporated in other structural forms than shown.

EMBODIMENT OF FIG. 1

In FIG. 1 there is depicted a side view of a regulator and pressure-control assembly wherein a manipulative end member 20 is conventionally provided with extending manipulative finger portions 21. This manipulative member 20 is carried on the end of a screw 22 extending through an inlet connector 24 to which an oxygen tank (not shown) is connected. The screw 22 actuates a pressure regulator carried in the portion identified as 26. This portion has a connector 27 which is removably connected to the readout device to be described in conjunction with FIG. 2. Removably attached to portion 26 is a connector portion 28 having a threaded outlet connector end 30 removably connected to the readout device. An outlet connector 32 is shown to which the flexible hose of the oxygen supply tube or mask (not shown) is conventionally connected. A knurled control knob 34 actuates a valve controlling gas flow to outlet 32.

EMBODIMENT OF FIG. 2

In FIG. 2 there is shown a rectangular case 36 for the digital readout. As shown, this case has a digital readout 38 which is lighted and numerically displays the pressure in the supply tank. A like digital readout 40 displays the rate of flow of oxygen to the patient or attendant. A separate digital readout 42 displays the consumption or residual amount of gas in the supply. On the top of case or housing 36 is a control switch 44 which turns the digital display on and off.

The digital displays 38, 40 and 42 are contemplated to be LED (Light Emitting Diode) readouts and, for the convenience and distinguishing by the user, preferably are in differential colors, i.e., red, green and yellow. The LED displays may be of any conveniently selected size, but ease of visual discrimination is an essential consideration. LED's for digital display conventionally have fourteen dip terminals and the numerals are at least about three-tenths of an inch in height. Very low voltage (1.7 VDC) and very low current drain (20 MA typical) are essential and conventional. The case or housing 36 may be of metal or plastic, but resistance to oxygen or other gases used therewith is essential. Within this housing or case 36 is carried the battery used to power this display and the other components. This battery is contemplated to be a nine-volt, DC long-life battery as the current drain during use is very small.

EMBODIMENT OF FIG. 3

Referring next to FIG. 3, there is shown a side view of a typical gauge installation utilizing a needle-actuated device. In this FIG. a threaded inlet conduit 46 feeds gas into the interior of the gauge body identified as 48. A needle 49 is carried by a rotatable post or shaft 50 and moves in response to the increase or decrease in pressure. The body 48 has a series of counterbored holes 52 disposed in a circular manner near the periphery of the body. In the smaller diameter hole 53 there is mounted an L-shaped, light-conducting rod 54. It is of note that the larger counterbore 55 provides a tubular shield or tunnel so that only directed light reaches the inserted end of the L-shaped rod 54. The shaft or post 50 extends in an axial alignment with the axis of the rotatable gauge upper surface 56. The needle 49 is carried on this shaft or post 50, but is positioned so as to avoid engagement or contact with the upper surface. This FIG. also depicts the post or shaft 50 as adapted to support and move S-shaped, light-conducting rod or fiber optic 58. An infrared, light-emitting diode 60 is carried by other means so that light-emitting from this source travels from the top surface thereof through this member 58 to its lower-end surface. In a reduction to practice, light-conducting members 54 and 58 are about three-sixteenths of an inch in diameter and are made of clear acrylic. The L-shaped member 54 and the S-shaped member 58 may be bent or cast as long as light-carrying properties are not affected.

Light from the emitter 60 travels through rod 58 and through the larger counterbore 55 to the top surface of L-shaped rod 54 and through this rod to actuate an enclosed reed switch 61. An electric signal is sent to a microprocessor 62 and then to a readout device such as digital display 40.

EMBODIMENT OF FIG. 4

In FIG. 4 there is depicted the gauge of FIG. 3 in an assembled condition. This showing is in a slightly enlarged scale from FIG. 3. A light emitter 60 is illustrated as sending a light beam to the top surface of the S-shaped, light-conducting rod 58. This S-shaped rod is mounted and fixedly secured to the post or shaft 50. For ease of calibration, rod 58 is aligned with the needle 49 so that as the needle is rotated the outlet end of said rod 58 directs a beam of light toward and into a larger counterbore hole 55. This S-shaped rod 58 is very light in weight and when mounted has both ends in a non-contacting condition so that there is an absence of friction of needle movement with any gauge response.

EMBODIMENTS OF FIGS. 5 AND 6

Figure 6:
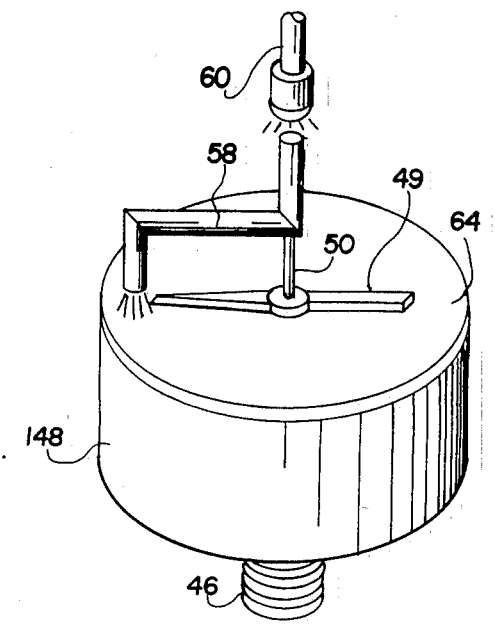
FIG. 6 represents an isometric view, also partly fragmentary, of the apparatus of FIG. 5 in an assembled condition and with the emitting light source and flow path indicated.

In FIGS. 5 and 6 the gauge of FIGS. 3 and 4 is shown but, rather than a larger counterbore 55 open to collect dust and the like, a thin, transparent cover member 64 may be affixed to the gauge body, now identified as 148. The other constructions, as far as the S-shaped rod 58, shaft 50 and connector threads 46, are as in FIGS. 3 and 4. Since the L-shaped rod is not susceptible to dust or dirt, a tightly-drilled hole 53 may be provided in the body 148 and the rod 54 brought near to the cover member 64. It is only necessary that light from an S-shaped rod 58 actuate or flow through one L-shaped rod 54 at a time. If desired, the reed switches 61 may be carried in this body 148. Needle 49 is shown and is used for alignment purposes, but if other aligning and confirming means is available a needle is not required.

EMBODIMENT OF FIG. 7

Figure 7:
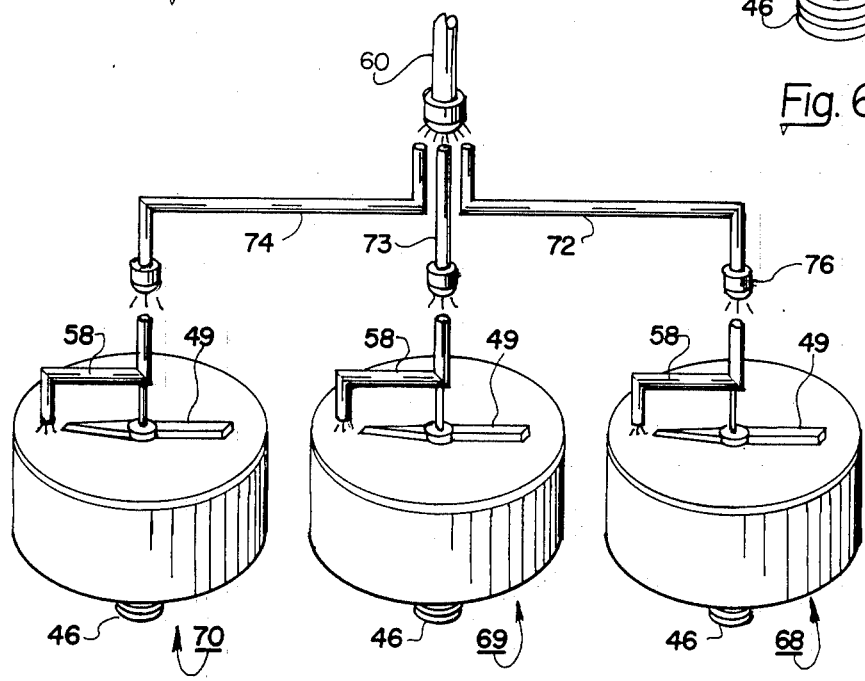
FIG. 7 represents an isometric view, partly diagrammatic, and showing a single emitting light source used to carry light to three S-shaped light transmitters to a remote location. As illustrated, the S-shaped light transmitting rods are carried by and rotated with the rotation of the associated carrying shaft or post.

In FIG. 7 there is depicted the emitter 60 as utilized for directing a light to three rotary devices. In this illustration, three gauge bodies are seen. For the purpose of identification, the three devices are numbered 68, 69 and 70. These are illustrative only for these devices are arranged, as desired, in the case or enclosure 36. Each body is shown as having a cover 64 and each carries an S-shaped rod 58. This FIG. shows all devices with a needle 49 and threaded connector inlet means 46. The needles 49 may be eliminated if other aligning means is provided. Lightdirecting and -carrying rods 72, 73 and 74 are shown with light magnifiers 76 on the discharge end of each rod. Rods 72 and 74 are depicted as S-shaped and rod 73 as straight, but any configuration may be utilized to accomodate the designer of the equipment. For the sake of identification, device 68 provides pressure determination, device 69 provides flow-rate determination, and 70 provides a totalizer of the flow use.

EMBODIMENTS OF FIGS. 8 AND 9 B

Figure 8:
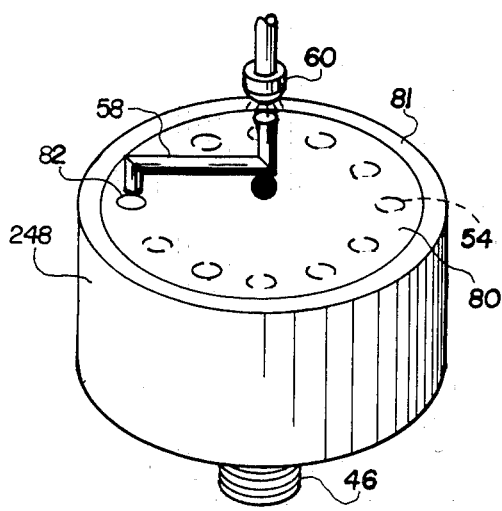
FIG. 8 represents an isometric view, also partly diagrammatic, and showing a light-conducting, S-shaped rod or optic used with a rotary body and with the S-shaped, light-carrying rod in fixed condition.
Figure 9B:
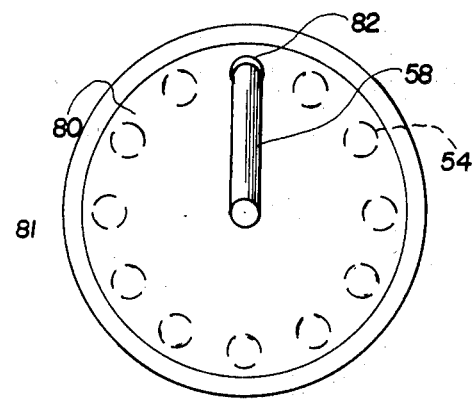
FIGS. 9 A and 9 B represent plan views depicting the lightconducting rod with its outlet end above and aligned with an aperture in a disc.
Figure 9A:
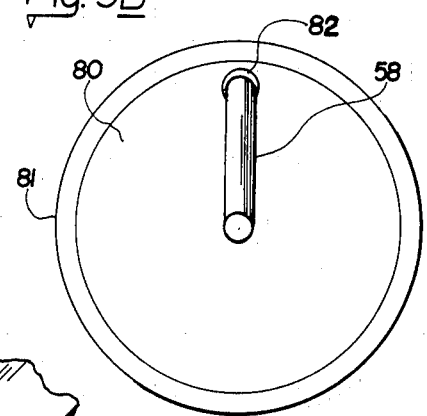

In FIGS. 8 and 9B it is noted that, rather than a needle shown in the previous FIGS., the needle is replaced with an opaque disc 80 which may be of plastic or metal. The S-shaped rod or conductor 58 is carried by the shaft or axle 50 identified above. As depicted, the disc 80 is carried with a protective rim or protrusion 81 formed on a body 248. As this device is secured to threaded connection by the threaded conductor 46, it is anticipated that body 248 in secured condition will be fixed. This disc 80 has a single aperture 82 formed therein. This disc 80 and the S-shaped rod 58 are moved in a rotary manner by the action of the device in response to pressure, flow or consumption. As the aperture 82 comes in way of a conducting rod 54 (FIG. 3), a light signal is sent to a reed switch 61 (FIG. 3) and then to the microprocessor 62. Light is indicated as emitting from diode 60 and the receivers 54 are shown in a circular pattern. Conventionally, there are fourteen positions corresponding to LED digital displays. FIG. 9 B is a top view showing the S-shaped rod 58 which carries the emitted light to an aperture 82. The aperture in the disc is sized to actuate only one receiver. A delay circuit is anticipated to be provided to inhibit confusion of signals when and while the end of rod 58 and the disc moves from one receiver to an adjoining receiver.

EMBODIMENT OF FIG. 9 A

In FIG. 9 A is depicted an arrangement similar to that in FIG. 8, showing a gauge body 248 with a screw inlet 46. A needle is not required for this assembly or unit and the shaft or stem 50 if it extends for mounting in this embodiment is non-rotating. Within this case is a flow-measuring device which is rotated by the flow of the gas. This device may be carried by an axle or shaft, but bearing means is provided to allow rotation of the internal device in response to consumption. At least a single aperture (not shown) is provided in the rim portion of this rotating flow-measuring device. This aperture or apertures is on the same radius as aperture 82 formed in disc 80. Light-conducting means to a reed switch 61 and microprocessor 62 (FIG. 3) is utilized as described above.

What is to be noted in this embodiment is that the light conductor 58 and the aperture 82 in disc 80 are fixed. The conductor 58 need not be carried on an extending shaft 50, but may be secured by other means. A needle is not indicated as it would be superfluous. The outlet end of the conductor 58 is aligned with aperture 82. The rotation of the internal measuring device brings the through aperture in the rim portion of the rotatable flowmeasuring device so that when the apertures are in coincidence light passes from the conductor 58 through the aligned apertures and thence to the reed switch 61 and microprocessor 62 and thence to the digital readout display 42. The passing of light through the aperture in the rotating rim develops pulses which provide a counting sequence for totalizing display. Whether consumption is measured or a subtraction is provided by this counting sequence is a matter of preference.

The cover plate 80 in FIGS. 9 A and 9 B is shown with an aperture 82, but it is to be noted that cover plate 80 may be coated with an opaque material and where the aperture 82 is shown, the masking may be removed to make this area a light-conducting means. The above disclosure is not contemplated to be limited to an aperture as such as many alternate constructions may be provided. Rotation of any component is a matter of selection as clockwise or counterclockwise rotation may be used satisfactorily.

EMBODIMENTS OF FIGS. 10 AND 11

Figure 10:
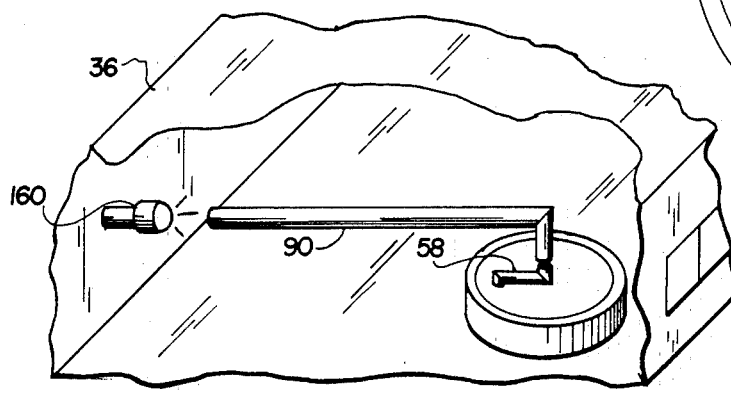
FIG. 10 represents an isometric view, very diagrammatic, and showing a light emitter carried by a back wall and with the lightcarrying rod or optic bent into an accommodating shape.
Figure 11:
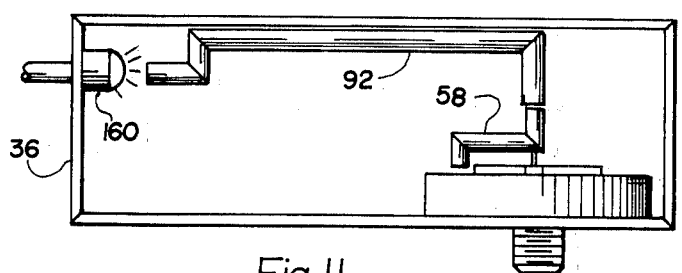
FIG. 11 represents a side view, quite diagrammatic, and illustrating the light-emitting source carried by a side of the housing and with the transmitting rod having only one bend.

In FIGS. 10 and 11 there are depicted two of the many ways that the light emitter may be carried. Case 36 may be arranged to have the light emitter 160 carried on the side wall of the enclosure or case. A rod 90 is shown as carrying light from this emitter to discharge light to the top of the S-shaped rod 58. In FIG. 11, rather than a serpentine rod, the light emitter 160 may direct this light to an L-shaped rod 92. The transmitted light is directed from the emitter source to the S-shaped conductor rod 58.

FIGS. 10 and 11 depict the many variations in which the light-emitting diode and the infrared light therefrom may be carried to a light-transmitting rod member. In the several embodiments described above, the S-shaped fiber optic or rod 58 is contemplated to be very light in weight and when mounted on the shaft 50 and when rotated is movable therewith and develops no friction in and with its rotation. This S-shaped rod is in a non-contacting position in each and every arrangement so as to avoid any and all possible alteration of a desired response value or extent by the gauge. The light-transmitting member 58 is shown and described as S-shaped, but this is merely the most convenient shape and other shapes may be employed as long as mounting means is provided for attachment to the post 50. The upper and lower end of this rod is free from engagement so as not to alter the response of the gauge or totalizer.

It is noted that the light emitter, the microprocessor and digital readout require electrical energy. It is contemplated that this will be a self-contained source, such as a nine-volt DC battery as used for many devices such as smoke alarms. The current consumption is very low and a step-down of voltage is easily achieved. The totalizer is a preferred benefit to the user, but is not essential for the use of portable or semi-portable tanks or containers as this invention is only to provide a digital readout convenience for the user so that he or she may visually ascertain the pressure and flow from a distance and visually determine any variation from the desired reading.

The above-described apparatus is believed to provide a basis for a method of display. This method includes the steps of:
(a) providing a rigid and generally elongated housing having inlet means for removably attaching a tank of gas to said rigid housing;
(b) carrying a screw-controlled pressure regulator within said elongated housing and providing an outlet for connection of a flexible conduit adapted to carry a supply fo gas to a user;
(c) providing two outlets with screw thread-connecting means for the transmittal of gas under pressure from this housing to an adjacent and associated case;
(d) providing a case or container and positioning said case adjacent said elongated housing and forming on said case a face portion in which are carried a plurality of visual-reading digital readout displays, and further providing in the bottom of said case at least two inlet means aligned with and adapted to be removably attached to the two screw-threaded outlets from said rigid housing;
(e) arranging within said case a plurality of gauge members and on each gauge member providing a rigid stem or shaft extending from and disposed so as to be substantially normal to an upper surface of a body of said gauge, this extending stem or shaft of a determined length and providing a supporting means;
(f) securing on said stem or shaft a light-conducting rod or member and forming a light-entry end-surface portion which in mounted condition on said shaft is normal to the axis of said shaft and conducting light through this rod and constructing this rod to form an outlet surface which is a small distance above and substantially parallel to the upper surface of the gauge body, this outlet-surface end near the periphery of said gauge body, and mounting said light-conducting rod so that its upper-entry end and its outlet end are in a non-engaging and friction-free position and condition;
(g) providing a source of electrical energy and containing said source within said case and actuating said electrical energy at selected periods of time;
(h) providing relative motion between the gauge stem and the gauge body;
(i) securing a light emitter to the case which is adapted to direct light to the entry-end portion of said light-conducting rod and discharging said light from the outlet surface end;
(j) carrying a multiplicity of light sensors by the gauge body and arranging said sensors in a circular pattern positioned adjacent the outlet end of the mounted light-transmitting rod, and actuating only one at a time of said sensors therewith, generating an electrical signal which is sent to a microprocessor energized by energy from the electrical source, and
(k) displaying at the face portion of the case a digital readout in association with each light-conducting rod and energizing said display, thereby providing a visual readout easily discerned by the user or attendant.

The above described apparatus and method provides a digital readout device so that it can be used safely without danger of a spark leading to a possible disaster. The digital readout is contemplated to be easily visible by the user and/or attendant whether in the home, hospital or nursing facility. The size of the digital display is a matter of choice and patient's ability to read the display. It is contemplated that the digital readouts will be differentiated either by size, color or combinations thereof so that easy confirmation of use and levels of supply is easily established. The purpose of this apparatus is to prevent gas use in other than prescribed levels. The above-described apparatus is the best mode contemplated, but manufacturing limitations may require small changes in design falling within the broad scope of the appended claims.

Terms such as "left," "right," "up," "down," "bottom," "top," "front," "back," "in," "out," "clockwise," "counterclockwise" and the like are applicable to the embodiments shown and described in conjunction with the drawings. These terms are merely for the purposes of description and do not necessarily apply to the position in which the reading and displaying in a digital readout manner apparatus for use with a tank may be constructed or used.

While particular embodiments of the apparatus, both with movable light-conducting rods and with non-rotating rods, have been shown and described, it is to be understood that the invention is not limited thereto and protection is sought to the broadest extent the prior art allows.

What is claimed is:

1. A digital readout and display apparatus indicating at least flow and pressure of gas such as oxygen and the like stored under pressure in a tank or container, said apparatus to the outlet of this tank of gas, this digital readout and display apparatus including:

(a) a rigid and generally elongated housing having inlet means for removably attaching said tank of gas to said rigid housing;

(b) a screw-controlled pressure regulator carried within said rigid housing with said housing adapted to pass absent accidental leakage gas from said tank while providing an outlet for connection of a flexible conduit adapted to carry gas at a determined flow rate and pressure to a user, this rigid housing having at least two outlets with screw thread means for transmitting gas under pressure to an adjacent associated case in which digital readouts are carried;

(c) a case or container disposed to be positioned adjacent the elongated housing, said case having a face portion in which are carried a plurality of visual-reading digital readout displays, this case having a plurality of inlet means aligned with and adapted to be removably attached to the plurality of screw-thread outlets of said rigid housing, and within this case there is provided a plurality of gauge members, each gauge member having a rigid stem or shaft extending from and substantially normal to an upper surface of a body of said gauge, this extending stem or shaft of a determined length and providing a supporting means;

(d) means for securing on said stem or shaft a light conducting rod or member having a light entry surface portion which in mounted condition is normal to the axis of said shaft, said light conducting rod constructed with an extending portion so as to carry light to an outlet surface a small distance above and parallel to an upper surface of a gauge body for said gauge and from which the rigid shaft extends, said outlet surface near the periphery of said body, and in a secured and mounted position said light conducting rod has its upper entry portion and its discharge end in a non-engaging friction-free condition;

(e) a source of electrical energy contained within said case and means for actuating said energy;

(f) means providing relative motion between the gauge stem and the gauge body;

(g) a light emitter secured to the case and near to and adapted to direct light to the entry end portion of said light conducting rod;

(h) a multiplicity of light sensors carried by the gauge body and arranged in a circular pattern and positioned adjacent the discharge end of the mounted light transmitting rod, and means for actuation of only one-at-a-time of said sensors, the actuation of each of said sensors generating an electrical signal which is sent to a microprocessor energized by the electrical source, and (i) a digital readout display associated with each light conducting rod, said display when energized providing a visual readout easily discerned by the user or attendant.

2. A digital readout and display apparatus, as in claim 1, in which the rigid housing has a screw-thread shaft which is rotated to cause a diaphragm-type pressure regulation to be effected.

3. A digital readout and display apparatus, as in claim 1, in which the gauge members in the case are fixed in place and the rigid shaft associated with said gauge members is rotated in relation to the gauge body.

4. A digital readout and display apparatus, as in claim 1, in which there are at least two gauge members and the rigid shaft in each carries on its end portion an affixed S-shaped rod through which the light is transmitted.

5. A digital readout and display apparatus, as in claim 1, in which the gauge body is formed with a multiplicity of like through counterbored holes and with said larger bore openings to the upper surface providing a light shield for stray light so that only light from the exit end of the light-conducting rod flows into each smaller bored hole, and there is mounted and secured another light conductor with the exit end of this light conductor arranged so that light therefrom actuates a reed switch which when closed sends an electrical signal to the microprocessor and thence to the associated digital readout.

6. A digital readout and display apparatus, as in claim 5, in which the light conductor mounted and secured in the smaller bore is an L-shaped light-conducting rod.

7. A digital readout and display apparatus, as in claim 1, in which in addition to a pressure indicator and flow regulator there is also provided a totalizer which includes a gauge-like body and there is a rigid stem or shaft extending therefrom and on which there is mounted said light-conducting rod.

8. A digital readout and display apparatus, as in claim 1, in which the electrical energy is provided by a nine-volt DC battery and the actuation is a switch carried by the digital display case.

9. A digital readout and display apparatus, as in claim 1, in which the pressure and regulator gauge are each secured to an outlet from the rigid housing by screw means.

10. A digital readout and display apparatus, as in claim 1, in which each gauge has a needle secured to and mounted on the shaft and positioned adjacent the top surface of the gauge body and before the securing of the attached light-conducting rod.

11. A digital readout and display apparatus, as in claim 10, in which the secured needle is aligned with the extending portion of the attached light-conducting rod.

12. A digital readout and display apparatus, as in claim 1, in which the gauge body has a transparent cover member on and affixed to its upper surface to provide a dust and debris shield from an accumulation which may obstruct the transmission of light from the rod to the sensor means.

13. A digital readout and display apparatus, as in claim 1, in which the light emitter provided light energy directed to and through light conductors each configured to carry light energy to one of three top entry surfaces of three light-conducting, rodlike members and as and when mounted carrying light to the entry end of a light-conducting rod each mounted on a rigid shaft.

14. A digital readout and display apparatus, as in claim 13, in which the light conductors from the emitter to the top entry surfaces of the three light-conducting rods carried on the rigid shafts include two generaly S-shaped light conductors and a single, relatively straight light conductor.

15. A digital readout and display apparatus, as in claim 1, in which the light emitter is carried by and in the side wall of the case and this emitted light energy is carried by a second lingtconducting member or rod having a light-receiving and discharge end and from this discharge end transmitted light is fed to the light-conducting rod carried by the rigid shaft.

16. A digital readout and display apparatus, as in claim 15, in which the second light-conducting member is generally S-shaped.

17. A digital readout and display apparatus, as in claim 15, in which the second light-conducting member is generally L-shaped.

18. A digital readout and display apparatus, as in claim 1, in which a totalizer is also provided which computes and digitally displays in the case a consumption total as a readout display, said totalizer provided in addition to the pressure gauge and pressure regulator gauge, said totalizer including a guage-like body and a rotatable member within said gauge-like body and exterior of this rotatable member having a multiplicity of like bores in said body and arrayed in a circular pattern and therethrough, and on a top surface of the gauge-like body there is provided an opaque rotating cover plate having formed therein and therethrough an aperture or light-passage means sized and spaced so that said aperture comes one at a time in way of a bore in the body, this totalizer having a rigid rotating shaft on which is secured a mounted light-conducting rod moving with the cover plate and with an entry portion and outlet surface portion in way of the aperture in the opaque cover, this light-conducting rod carrying light energy from said source and when the aperture and bore are in alignment, light reaches the sensor and pulses are sent to the microprocessor which makes the computation and sends signals to a digital display for indication of said total to a user or attendant.

19. A digital readout and display apparatus, as in claim 1, in which the elongated housing has a screw-actuated regulator that is manipulated to regulate the flow of gas from the tank or container and at the other end of this housing is a valve that is opened or closed to the flow of gas under regulated pressure from an outlet and to the flexible conduit.

20. A digital readout and display apparatus indicating flow and pressure of gas such as oxygen and the like stored under pressure in a tank or container and including a totalizer digital readout display, said apparatus attachable to the outlet of this tank of gas, this digital readout and display apparatus including:

(a) a rigid and generally elongated housing having inlet means for removably attaching said tank of gas to said rigid housing;

(b) a screw-controlled pressure regulator carried within said rigid housing with said housing adapted to pass, absent accidental leakage, gas from said tank while providing an outlet for connection of a flexible conduit adapted to carry gas at a determined flow rate and pressure to a user, this rigid housing having two outlets with screw-thread means for transmitting gas under pressure to an adjacent associated case in which digital readouts are carried;

(c) a case or container disposed to be positioned adjacent the elongated housing, said case having a face portion in which are carried three visual-reading digital readout displays, this case having two inlet means aligned with and adapted to be removably attached to the two screw-thread outlets of said rigid housing, and within this case there are provided two gauge members, each gauge member having a rigid stem or shaft extending from and substantially normal to an upper surface of a body of said gauge, this extending stem or shaft of a determined length and providing a supporting means;

(d) means for securing on said stem or shaft a light-conducting rod or member having a light-entry surface portion which in mounted condition is normal to the axis of said shaft, said light-conducting rod constructed so as to carry light to an outlet surface a small distance above and parallel to an upper surface of a gauge body for said gauge and from which the rigid shaft extends, said outlet surface near the periphery of said gauge body, and in a secured and mounted position said light-conducting rod has its upper-entry portion and its outlet-surface end in a non-engaging, friction-free condition;

(e) a source of electrical energy contained within said case and means for actuating said energy;

(f) a light emitter secured to the case and near to and adapted to direct light to the entry end of said light-conducting rod;

(g) a multiplicity of light sensor means carried by each gauge body and arrayed in a circular pattern with the axis coincidental with said stem or shaft, these sensor means positioned adjacent the outlet-surface end of the mounted light-transmitting rod, and means for the actuation of only one at a time of said sensors, the actuation of each sensor generating an electrical signal which is sent to a microprocessor energized by the electrical source;

(h) a digital readout display associated with each rotating light-conducting rod used with a gauge means, said display, when energized, providing a visual readout easily discerned by the user or attendant of the apparatus, and (i) a totalizer which computes and digitally displays in said front of the case a consumption readout, said totalizer having a gauge-like body with a rotatable member carried within, this rotatable member having a bore therethrough at the rim portion thereof and on the upper surface of the gauge-like body there is provided an opaque cover plate in which there is formed an aperture or light-passage means sized, spaced and positioned so that it comes in way of the bore in the rotated member, and with this totalizer further having a secured and mounted light-conducting rod with an entry end and an outlet-surface end positioned in way of the aperture or light-passage means in the opaque cover, this light-conducting rod carrying light energy from said emitter and, when the aperture or light-passage means and bore are in alignment, light reaches a sensor and electrical pulses are sent to the microprocessor which makes the computation and sends signals to a digital display for indication of said consumption or remainder in the tank to a user or attendant.

21. A method for reading and displaying in a digital readout manner at least the flow and pressure of a gas such as oxygen and the like which is stored under pressure in a tank or container, said method including apparatus attachable to the outlet of the tank of gas, this method including the steps of:

(a) providing a rigid and generally elongated housing having inlet means for removably attaching a tank of gas to said rigid housing;

(b) carrying a screw-controlled pressure regulator within said elongated housing and providing an outlet for connection of a flexible conduit adapted to carry a supply of gas to a user;

(c) providing two outlets with screw thread-connecting means for the transmittal of gas under pressure from this housing to an adjacent and associated case;

(d) providing a case or container and positioning said case adjacent said elongated housing and forming on said case a face portion in which are carried a plurality of visual-reading digital readout displays, and further providing in the bottom of said case at least two inlet means laigned with and adapted to be removably attached to the two screw-threaded outlets from said rigid housing;

(e) arranging within said case a plurality of gauge members and on each gauge member providing a rigid stem or shaft extending from and disposed so as to be substantially normal to an upper surface of a body of said gauge, this extending stem or shaft of a determined length and providing a supporting means;

(f) securing on said stem or shaft a light-conducting rod or member and forming a light-entry end-surface portion which in mounted condition on said shaft is normal to the axis of said shaft and conducting light through this rod and constructing this rod to form an outlet surface which is a small distance above and substantially parallel to the upper surface of the gauge body, this outletsurface end near the periphery of said gauge body, and mounting said light-conducting rod so that its upper-entry end and its outlet end are in a non-engaging and friction-free position and condition;

(g) providing a source of electrical energy and containing said source within said case and actuating said electrical energy at selected periods of time;

(h) providing relative motion between the gauge stem and the gauge body;

(i) securing a light emitter to the case which is adapted to direct light to the entry-end portion of said light-conducting rod and discharging said light from the outlet-surface end;

(j) carrying a multiplicity of light sensors by the gauge body and arranging said sensors in a circular pattern positioned adjacent the outlet end of the mounted light-transmitting rod, and actuating only one at a time of said sensors therewith, generating an electrical signal which is sent to a microprocessor energized by energy from the electrical source, and (k) displaying at the face portion of the case a digital readout in association with each light-conducting rod and energizing said display, thereby providing a visual readout easily discerned by the user or attendant.

22. A method for reading and displaying a digital readout, as in claim 21, which includes the further step of providing in the elongated housing a flow control valve which is manipulated to regulate the flow of gas from the supply tank to the flexible conduit and the user.

23. A method for reading and displaying in a digital readout case an added totalizer display as in claim 21 which includes the further steps of providing a gauge-like body and a rotatable member within said body and exterior of the rotatable member forming in the gauge-like body a multiplicity of bores of substantially like size, these bores arrayed in a circular pattern and therethrough, and providing on the top surface of this body a rotating opaque cover plate and forming in said plate and therethrough an aperture or light-passage means sized and spaced from said stem so that said aperture or light-passage means comes in way of said outlet surface of a lightconducting rod secured and mounted on an extending stem or shaft at the axis of the rotatable member, and when the aperture or lightpassage means is in alignment, light reaches a sensor sending electrical pulses to a microprocessor which makes the computation and sends signals to the added totalizer digital display for indication of consumption.

24. A method for reading and displaying in a digital readout case an added totalizer display as in claim 21 which includes the further steps of providing a gauge-like body and a rotatable member within said body and on the rim portion of said rotatable member forming at least one bore through which light may flow to a sensor; providing and positioning on the top surface of this gauge-like body a nonrotating opaque cover plate above which is secured and mounted a light-conducting rod having an entry end and an outlet-surface end positioned in way of the aperture or light-passage means in the opaque cover; carrying light energy from said emitter, and when the aperture or light-passage means and bore are in alignment, light reaches a sensor sending electrical pulses to the microprocessor which makes the computation and sends appropriate signals to the associated digital display, indicating to the user or attendant the consumption or remainder of gas in the tank.

* * * * *